United States Patent
Goldston et al.

(10) Patent No.: US 8,495,825 B2
(45) Date of Patent: Jul. 30, 2013

(54) FOREFOOT CATAPULT FOR ATHLETIC SHOES

(75) Inventors: Mark Goldston, Beverly Hills, CA (US); Adam Goldston, Los Angeles, CA (US); Ryan Goldston, Los Angeles, CA (US); Jon Bemis, Boxford, MA (US)

(73) Assignee: Athletic Propulsion Labs LLC

( * ) Notice: Subject to any disclaimer, the term of this patent is extended or adjusted under 35 U.S.C. 154(b) by 0 days.

(21) Appl. No.: 13/341,267

(22) Filed: Dec. 30, 2011

(65) Prior Publication Data

US 2012/0096741 A1    Apr. 26, 2012

Related U.S. Application Data

(63) Continuation of application No. 12/467,679, filed on May 18, 2009, now Pat. No. 8,112,905.

(60) Provisional application No. 61/168,533, filed on Apr. 10, 2009.

(51) Int. Cl.
*A43B 13/28* (2006.01)

(52) U.S. Cl.
USPC ...................................... 36/27; 36/28; 36/114

(58) Field of Classification Search
USPC .................... 36/27, 28, 114, 7.8, 35 R, 37
See application file for complete search history.

(56) References Cited

U.S. PATENT DOCUMENTS

| | | | |
|---|---|---|---|
| 507,490 A | 10/1893 | Gambino | |
| 1,069,001 A | 7/1913 | Guy | |
| 1,088,328 A | 2/1914 | Cucinotta | |
| 2,357,281 A | 8/1944 | Williams | |
| 2,394,281 A | 2/1946 | Williams | |
| 2,437,227 A * | 3/1948 | Hall | 36/28 |
| 2,721,400 A * | 10/1955 | Israel | 36/169 |
| 4,457,084 A * | 7/1984 | Horibata et al. | 36/7.8 |
| 4,486,964 A | 12/1984 | Rudy | |
| 4,506,460 A | 3/1985 | Rudy | |
| 4,592,153 A | 6/1986 | Jacinto | |
| 4,709,489 A | 12/1987 | Welter | |
| 4,771,554 A * | 9/1988 | Hannemann | 36/27 |

(Continued)

FOREIGN PATENT DOCUMENTS

| | | |
|---|---|---|
| EP | 0 552 994 B1 | 7/1993 |
| EP | 1 346 655 B1 | 9/2003 |
| WO | WO-99/38405 A1 | 8/1999 |

OTHER PUBLICATIONS

International Search Report and Written Opinion of the International Searching Authority for PCT patent application No. PCT/US2010/030012 dated Jul. 27, 2010.

(Continued)

*Primary Examiner* — Marie Patterson
(74) *Attorney, Agent, or Firm* — Foley & Lardner LLP

(57) ABSTRACT

An athletic shoe includes an upper, an outsole, a pair of hinged plates, and a spring. The pair of hinged plates are attached between the outsole and the upper in a forefoot portion of the shoe, and the spring biases the plates apart, so that energy is stored and returned during a propulsion phase of a gait cycle in a human step. Foam may be disposed between the plates. A shroud may enclose an outer periphery of the plates. An adjustable torsion spring may be disposed in a hinge portion of the plates, and one or more wave springs may be disposed between the plates.

23 Claims, 12 Drawing Sheets

U.S. PATENT DOCUMENTS

| | | | |
|---|---|---|---|
| 4,815,221 A | 3/1989 | Diaz | |
| 4,854,057 A | 8/1989 | Misevich et al. | |
| 4,878,300 A | 11/1989 | Bogaty | |
| 4,901,987 A | 2/1990 | Greenhill et al. | |
| 5,060,401 A | 10/1991 | Whatley | |
| 5,159,767 A * | 11/1992 | Allen | 36/27 |
| 5,203,095 A * | 4/1993 | Allen | 36/27 |
| 5,279,051 A | 1/1994 | Whatley | |
| 5,282,325 A | 2/1994 | Beyl | |
| D355,755 S | 2/1995 | Kilgore | |
| 5,437,110 A | 8/1995 | Goldston et al. | |
| 5,464,197 A | 11/1995 | Ecclesfield | |
| 5,596,819 A | 1/1997 | Goldston et al. | |
| 5,622,358 A | 4/1997 | Komura et al. | |
| 5,649,373 A | 7/1997 | Winter et al. | |
| 5,651,196 A | 7/1997 | Hsieh | |
| 5,706,589 A | 1/1998 | Marc | |
| 5,743,028 A * | 4/1998 | Lombardino | 36/27 |
| 5,845,419 A | 12/1998 | Begg | |
| 5,875,567 A | 3/1999 | Bayley | |
| 5,896,679 A | 4/1999 | Baldwin | |
| 6,006,449 A * | 12/1999 | Orlowski et al. | 36/27 |
| 6,029,374 A | 2/2000 | Herr et al. | |
| D433,216 S | 11/2000 | Avar et al. | |
| 6,282,814 B1 | 9/2001 | Krafsur et al. | |
| 6,393,731 B1 | 5/2002 | Moua et al. | |
| 6,457,261 B1 | 10/2002 | Crary | |
| 6,568,102 B1 * | 5/2003 | Healy et al. | 36/28 |
| 6,665,957 B2 | 12/2003 | Levert et al. | |
| 6,751,891 B2 | 6/2004 | Lombardino | |
| 6,860,034 B2 | 3/2005 | Schmid | |
| 6,865,824 B2 | 3/2005 | Levert et al. | |
| 6,886,274 B2 | 5/2005 | Krafsur et al. | |
| D507,094 S | 7/2005 | Lyden | |
| 6,928,756 B1 | 8/2005 | Haynes | |
| 6,944,972 B2 | 9/2005 | Schmid | |
| 6,983,553 B2 | 1/2006 | Lussier et al. | |
| 7,100,308 B2 | 9/2006 | Aveni | |
| 7,140,125 B2 | 11/2006 | Singleton et al. | |
| 7,159,338 B2 | 1/2007 | LeVert et al. | |
| D538,018 S | 3/2007 | Hlavacs | |
| 7,219,447 B2 | 5/2007 | LeVert et al. | |
| 7,287,340 B2 | 10/2007 | Talbott | |
| 7,290,354 B2 | 11/2007 | Perenich | |
| 7,418,790 B2 | 9/2008 | Kerrigan | |
| 7,441,347 B2 | 10/2008 | LeVert et al. | |
| 7,900,376 B2 | 3/2011 | Rabushka | |
| 8,112,905 B2 * | 2/2012 | Bemis et al. | 36/27 |
| 2001/0049888 A1 | 12/2001 | Krafsur et al. | |
| 2002/0073579 A1 | 6/2002 | Lombardino | |
| 2002/0133976 A1 | 9/2002 | Crutcher | |
| 2002/0144430 A1 | 10/2002 | Schmid | |
| 2002/0174567 A1 | 11/2002 | Krafsur et al. | |
| 2002/0189134 A1 | 12/2002 | Dixon | |
| 2003/0051372 A1 | 3/2003 | Lyden | |
| 2003/0126760 A1 | 7/2003 | LeVert et al. | |
| 2003/0163933 A1 | 9/2003 | Krafsur et al. | |
| 2003/0192200 A1 | 10/2003 | Dixon | |
| 2003/0200677 A1 * | 10/2003 | Abraham | 36/27 |
| 2003/0217483 A1 | 11/2003 | Abraham | |
| 2004/0118017 A1 | 6/2004 | Dalton et al. | |
| 2004/0154191 A1 | 8/2004 | Park | |
| 2004/0237340 A1 | 12/2004 | Rembrandt | |
| 2005/0081401 A1 | 4/2005 | Singleton et al. | |
| 2005/0126039 A1 | 6/2005 | LeVert et al. | |
| 2005/0138839 A1 | 6/2005 | Terlizzi et al. | |
| 2005/0166422 A1 | 8/2005 | Schaeffer et al. | |
| 2005/0193595 A1 | 9/2005 | Jennings | |
| 2005/0241184 A1 | 11/2005 | LeVert et al. | |
| 2005/0247385 A1 | 11/2005 | Krafsur et al. | |
| 2006/0048412 A1 | 3/2006 | Kerrigan | |
| 2006/0130371 A1 | 6/2006 | Schneider | |
| 2006/0277788 A1 | 12/2006 | Fujii | |
| 2008/0184596 A1 | 8/2008 | Yu | |
| 2008/0209762 A1 | 9/2008 | Krafsur | |
| 2008/0271340 A1 | 11/2008 | Grisoni et al. | |
| 2008/0313928 A1 * | 12/2008 | Adams et al. | 36/103 |
| 2009/0064536 A1 | 3/2009 | Klassen et al. | |
| 2009/0113760 A1 | 5/2009 | Dominguez | |
| 2010/0257752 A1 * | 10/2010 | Goldston et al. | 36/108 |
| 2010/0257753 A1 | 10/2010 | Bemis et al. | |

OTHER PUBLICATIONS

International Preliminary Report on Patentability for PCT patent application No. PCT/US2010/030012 dated Oct. 11, 2011.

U.S. Office Action issued for U.S. Appl. No. 12/467,679 and mailed on Sep. 7, 2011.

Notice of Allowance and Fee(s) Due issued for U.S. Appl. No. 12/467,679 and mailed on Nov. 14, 2011.

U.S. Office Action for U.S. Appl. No. 12/754,333 mailed on Jun. 29, 2012.

* cited by examiner

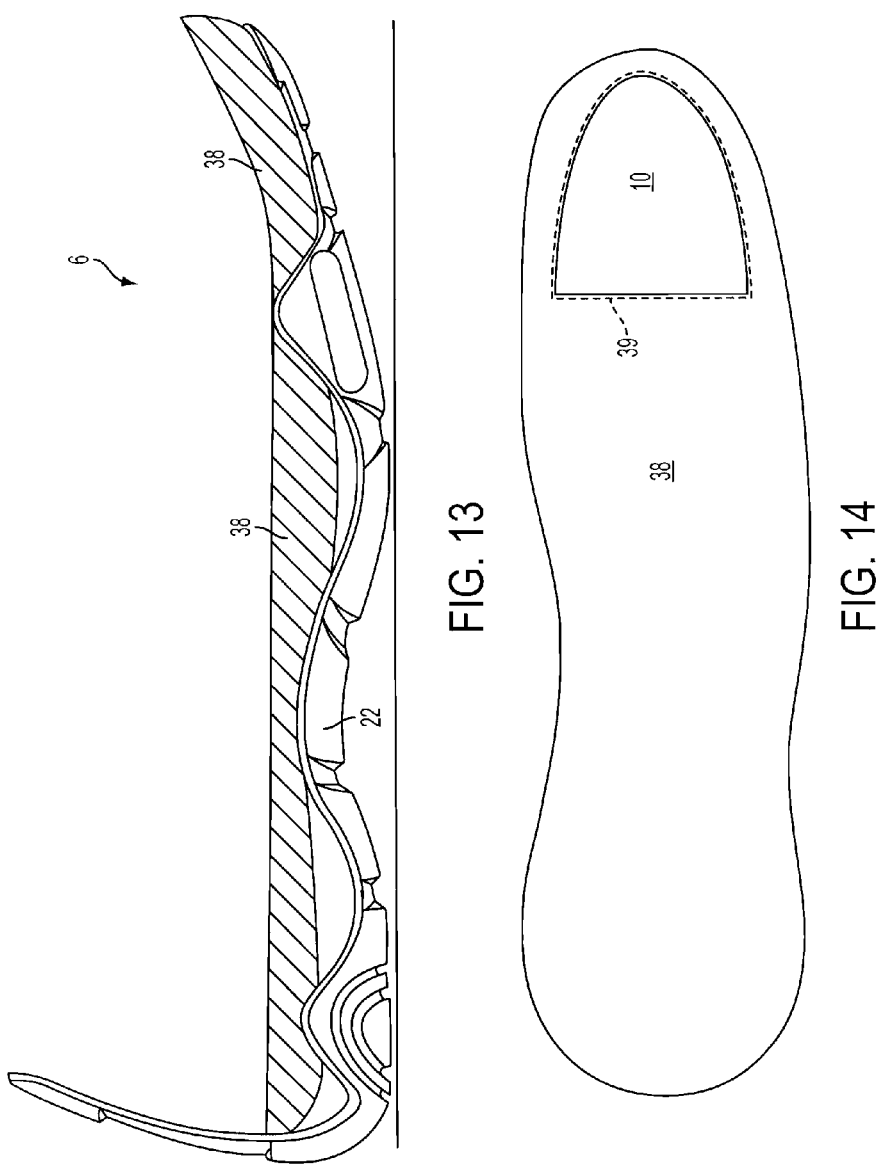

FOREFOOT CATAPULT FOR ATHLETIC SHOES

CROSS-REFERENCE TO RELATED PATENT APPLICATIONS

This application is a continuation of U.S. application Ser. No. 12/467,679, filed on May 18, 2009, which claims the benefit of U.S. Provisional Application No. 61/168,533, filed Apr. 10, 2009, the entire contents of both of which are incorporated by reference herein.

BACKGROUND OF THE INVENTION

1. Field of the Invention

Embodiments of the present invention relate in general to footwear, and particularly to energy absorption and return systems for use in athletic footwear.

2. Related Art

In prior U.S. Pat. Nos. 5,437,110 and 5,596,819, issued in the names of two of the inventors herein, a discussion was provided of the desirability of providing adjustable footstrike energy shock absorption and return. Those patents disclosed the use of a device disposed in the midsole of a shoe under the heel. The device used an adjustable mechanism to store and return to the wearer's foot shock energy experienced during walking or running.

Those prior patents discussed a variety of related art, including U.S. Pat. Nos. 4,486,964, 4,506,460, 2,357,281, 2,394,281, 4,709,489, 4,815,221, 4,854,057, and 4,878,300 as disclosing a variety of spring systems for shoes that related to heel-strike energy absorption and return. Since the time of those patents, other patents and applications have addressed a variety of spring mechanisms for shoes. See, e.g., U.S. Pat. Nos. 6,282,814, 6,751,891, 6,865,824, 6,886,274, 7,159,338, 7,219,447, 7,287,340, and 7,290,354, as well as published applications 2005/0166422 and 2009/0064536.

A step forward or stride consists of a dynamic process sometimes referred to as gait. The science surrounding gait is extensive but embodiments of the present invention focus upon that aspect that a layman might identify as toe-off when jumping. Gait can be broken down into three distinct phases as follows: (1) the contact phase which begins with heel strike and continues until the foot is flat on the surface, (2) the mid-stance phase beginning from the foot flat and a shift of body weight and continuing until the heel rises, and, lastly, (3) the propulsion phase where toe-off (or jumping) would occur.

The related art does not focus upon the propulsion phase of the gait cycle. Most of the devices are directed to the contact phase and use heel-related mechanisms to store and return energy. Because energy stored in the contact phase via a heel spring is dissipated by the time the propulsion phase begins, heel springs have not proven effective for energy storage and return. Some of the related art also use springs under the ball of the foot. In addition to not being effective in the propulsion phase, such devices can have adverse physiological effects on the foot if not properly positioned.

SUMMARY OF THE DISCLOSURE

A catapult device in accordance with various embodiments of the present invention is located ahead of the ball of the foot and directly below the forefoot of the foot in a forefoot portion of a shoe. In various embodiments, the catapult device stores and returns energy during the propulsion phase of a gait. In some embodiments, the catapult device includes opposing plates hinged together and biased apart by a torsion spring that may be adjustable. Also, in some embodiments, lightweight foam is disposed between the plates. In other embodiments, additional springs, such as wave springs, or the like, may be disposed within or outside of foam at the front of the catapult device.

Such catapult devices are very effective in storing and returning energy where an athlete needs it most: at the front of the shoe, which is where the toe-off in running or jumping occurs. Furthermore, in various embodiments, the catapult device replaces a portion of the midsole that would otherwise be under the forefoot, and is thus easy to install in a production environment, as it simply is affixed to the outsole. The use of a torsion spring in various embodiments allows for easy exterior adjustability of the catapult device by a wearer of the shoe.

A shoe in accordance with an embodiment of the present invention comprises an upper, an outsole, a pair of hinged plates attached between the outsole and the upper in a forefoot portion of the shoe, and a spring biasing the plates apart, whereby energy is stored and returned during a propulsion phase of a gait cycle in a human step.

In various embodiments, the shoe further comprises foam disposed between the plates. Also, in various embodiments, the shoe further comprises a shroud enclosing an outer periphery of the plates. In some embodiments, the spring comprises a torsion spring disposed in a hinge portion of the plates. Also, in some embodiments, the torsion spring is adjustable.

In various embodiments, the spring comprises at least one wave spring disposed between the plates. In some embodiments, the shoe further comprises an energy return material disposed between the plates. In some embodiments, the energy return material comprises rubber or Hytrel®. In various embodiments, one of the plates wraps around a portion of the upper to form a toe bumper.

A device in accordance with an embodiment of the present invention is installed in a forefoot portion of a shoe between an upper and an outsole of the shoe, and is used to store and return energy during a propulsion phase of a gait cycle in a human step. In various embodiments, the device comprises a pair of opposing plates, hinge means for attaching the plates together at one end, and spring means for biasing the plates apart, whereby, when a wearer of the shoe moves into an apex of a gait cycle, a force applied on the plates pushes the plates together, increasing a loading of the spring means, and providing the wearer with a launch factor equal to a release of torque from the spring means.

In some embodiments, the spring means comprises a torsion spring. Also, in some embodiments, the spring means further comprises at least one wave spring. In various embodiments, the device further comprises means for precluding debris from entering an area between the plates. In some embodiments, the means for precluding debris from entering the area between the plates comprises foam. Also, in some embodiments, the means for precluding debris from entering the area between the plates comprises a shroud along a peripheral portion of the plates. In various embodiments, the spring means comprises an adjustment means for changing a force applied by the spring means to the plates to bias them apart.

A shoe in accordance with an embodiment of the present invention comprises an outsole having a heel portion, a ball portion, and a forefoot portion, and a catapult device comprising two plates and a spring, where the catapult device is located at least partially above the forefoot portion of the outsole. In various embodiments, the shoe further comprises a midsole, and the catapult device is located in a cavity in the midsole. In some embodiments, the spring is located between the two plates.

A method in accordance with an embodiment of the present invention allows for storing and returning energy during a propulsion phase of a gait cycle in a human step using a catapult device in a shoe including two plates and a spring that biases the two plates apart from each other. In various embodiments, the method comprises applying, with a foot, a force on at least one of the two plates that is positioned in the shoe beneath a forefoot portion of the foot, so as to move the two plates together and increase a loading of the spring, and launching the foot due to the two plates being moved apart by the spring as the foot is being lifted.

BRIEF DESCRIPTION OF THE DRAWINGS

FIG. 13 shows a side view of a portion of a shoe in accordance with an embodiment of the present invention;

FIG. 14 shoes a top view of a midsole having a cavity in which a catapult device is located in accordance with an embodiment of the present invention.

DETAILED DESCRIPTION OF PREFERRED EMBODIMENTS

Figure 1:
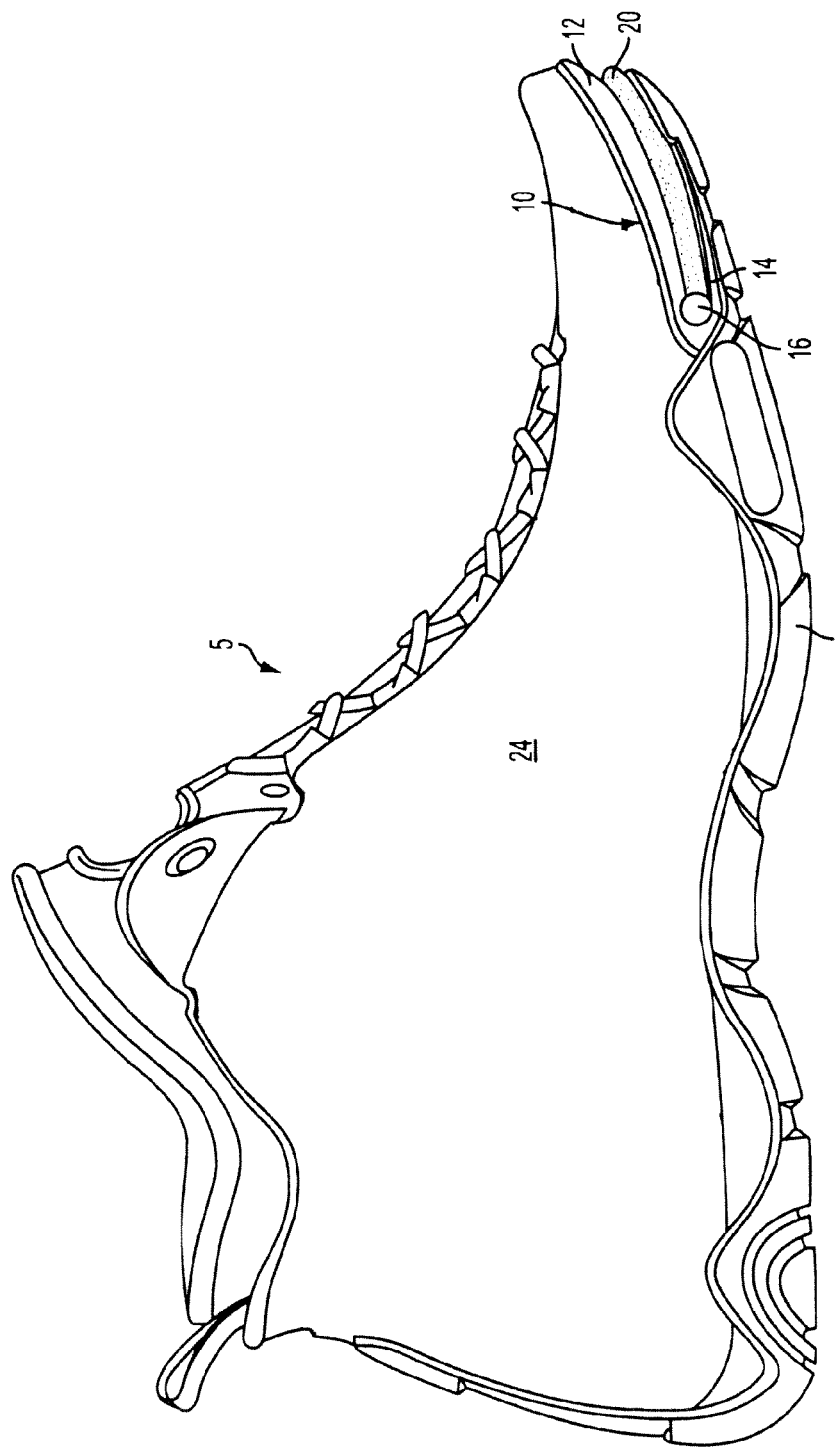
FIG. 1 shows a side view of a catapult device in accordance with an embodiment of the present invention when installed in an athletic shoe.
Figure 4:
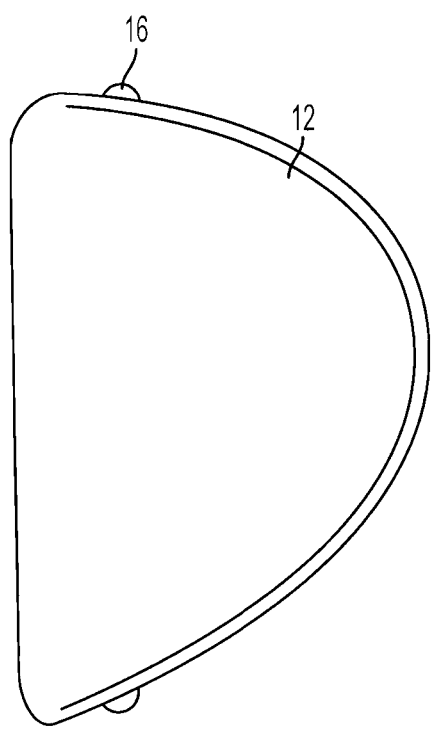
FIG. 4 shows a top view of a catapult device in accordance with an embodiment of the present invention.
Figure 5:
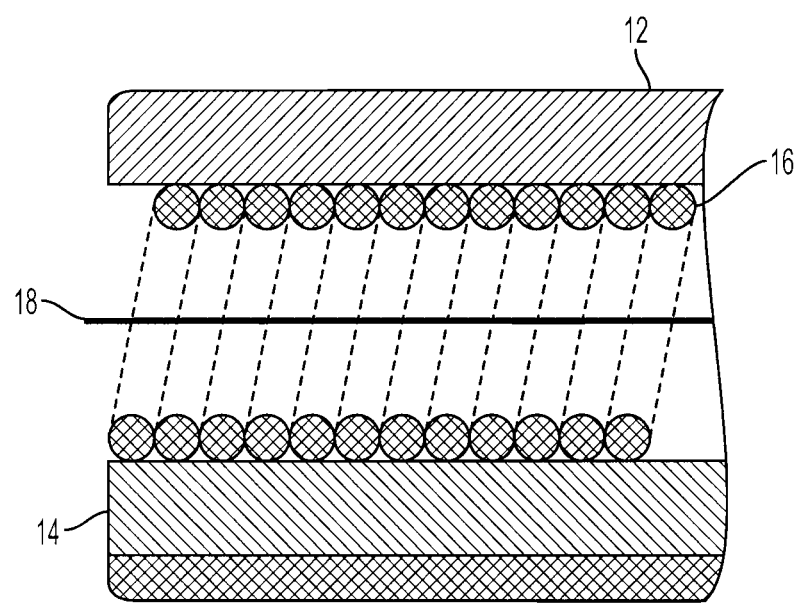
FIG. 5 shows a partial cross sectional view of a torsion spring mounting in a catapult device in accordance with an embodiment of the present invention.

Referring to FIG. 1, an athletic shoe 5 is provided with a catapult device 10 according to an embodiment of the present invention. The catapult device 10 is mounted in an outsole 22 of the shoe 5, as shown in more detail in FIG. 2. The catapult device 10 includes a top plate 12 and a bottom plate 14 that are hinged together via a pin 18 (or similar means), as shown in FIG. 5. In various embodiments, the plates 12 and 14 are designed such that they have a very limited motion around a hinge axis. Also, in various embodiments, in a neutral position the plates 12 and 14 are parallel to each other, forming what might be explained as a duck-bill, as shown in FIGS. 3 and 4. In some embodiments, the plates 12 and 14 have a limited motion that allows movement toward one another but not opening beyond (any more than) the two plates being parallel to each other.

With reference to FIG. 1, various materials could be used for the plates 12 and 14, including polymer, block polymer, monomer, etc., that exhibit properties conducive to use in processes known as injection molding, and in some cases extrusion and the like, or other types of molding such as compression molding, etc. In various embodiments, material is selected for rigidity, because in practice the catapult device 10 will be subjected to tremendous force as a wearer goes through a gait cycle ending up on the balls of the feet. At the apex of the propulsion phase of the gait cycle, the catapult device 10 will be subjected to several times the wearer's body weight as the device is "loading". During this loading, it may be desirable that the catapult device 10 does not deform under stress. Such deformity would result in loss of load factor resulting in diminished return of energy and a corresponding decrease in the actual intended performance. As such, thin steel is potentially usable to reinforce other materials to ensure the requisite rigidity.

A variety of hinge mechanisms could be used with the plates 12 and 14, such as a barrel hinge, butt hinge, living hinge, plain hinge, or others. In various embodiments, a barrel hinge can include molded features to control a movement of the plates 12 and 14 around its axis, to prevent it from springing open, such as a slot and key feature, or notched stop. A barrel hinge would form the two plates 12 and 14 into a single device with a single axis of rotation.

In various embodiments, a helical torsion spring 16 may encircle the hinge pin 18, and may bias the plates 12 and 14 apart consistent with a strength of the particular spring utilized. An embodiment including the helical torsion spring 16 is shown in more detail in FIG. 5. In various embodiments, the helical torsion spring 16 is constructed from a metal wire or rod twisted or formed into a helical coil. In such embodiments, each end of the coil may be biased against the plates 12 and 14. Such torsion springs may be similar to those shown in U.S. Pat. No. 5,464,197. That patent shows a coil spring member with arms that provide an opposing bias. Adjustment of the torsion is achieved therein via an inner coil which acts to control the deformation of an outer coil. If a hinge pin 18 is used, it could be positioned along line D as shown in the '197 patent. Alternatively, a torsion spring could be located within a barrel hinge formed as an integral member of the top and bottom plates 12 and 14. Once the catapult device has been properly assembled and installed within the forepart of the footwear, and the wearer moves into the apex of a gait cycle (i.e. toe-off in jumping), the force applied to the top plate 12 will push the two plates 12 and 14 together. This will increase the torque loading of the helical torsion spring 16, and provide the wearer with a launch factor equal to a release of torque from the helical torsion spring 16.

Figure 2:
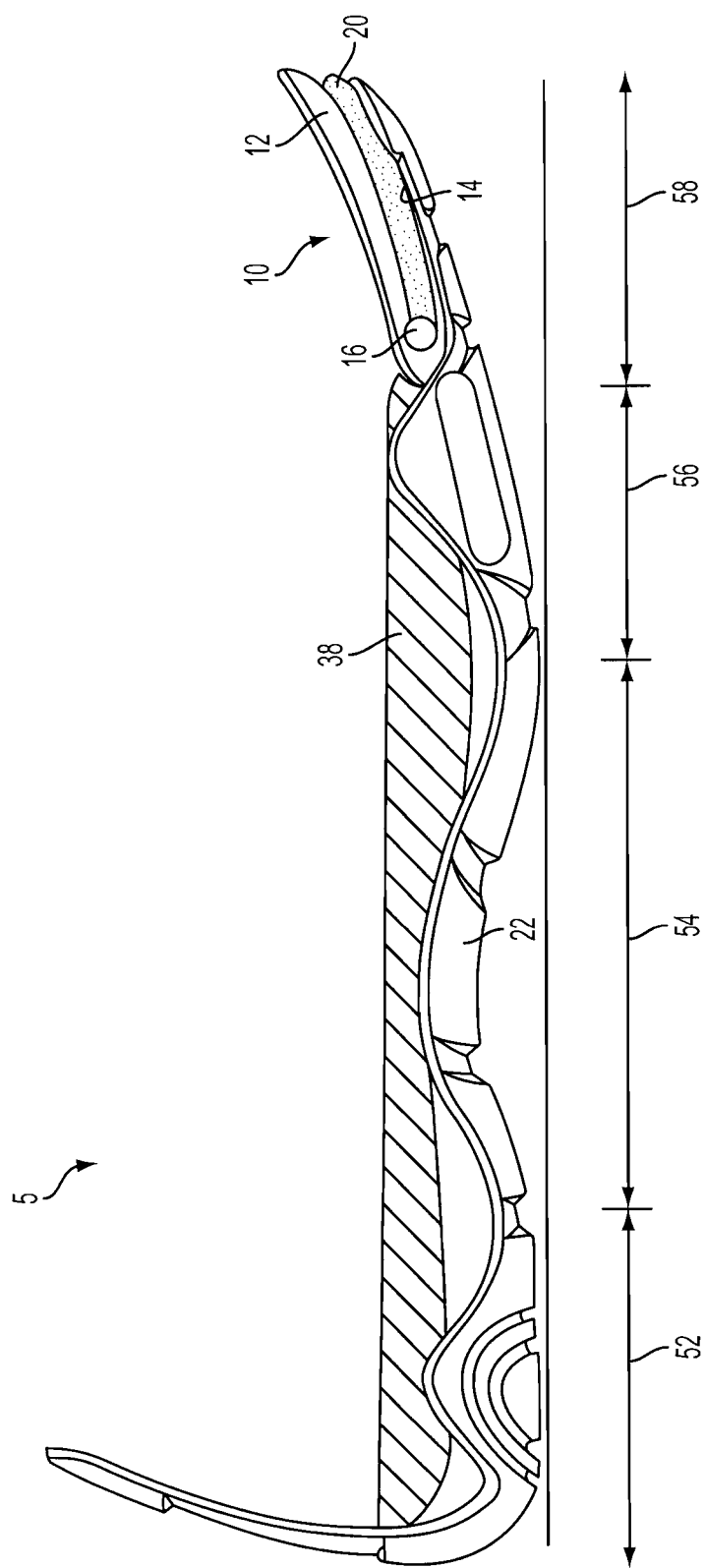
FIG. 2 shows a side view of a portion of a shoe in accordance with an embodiment of the present invention including a catapult device in an outsole of the shoe.
Figure 3:
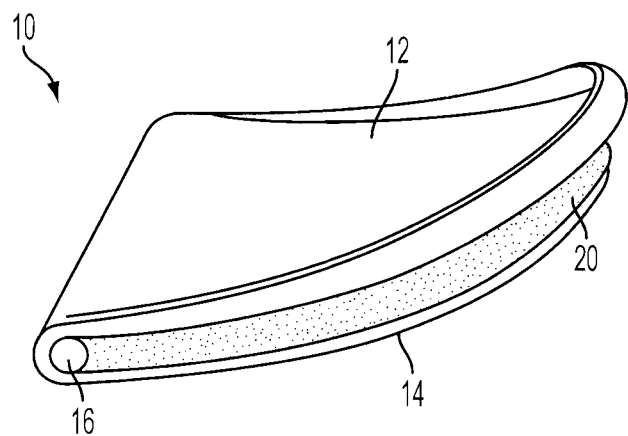
FIG. 3 shows a perspective view of a catapult device in accordance with an embodiment of the present invention.
Figure 8:
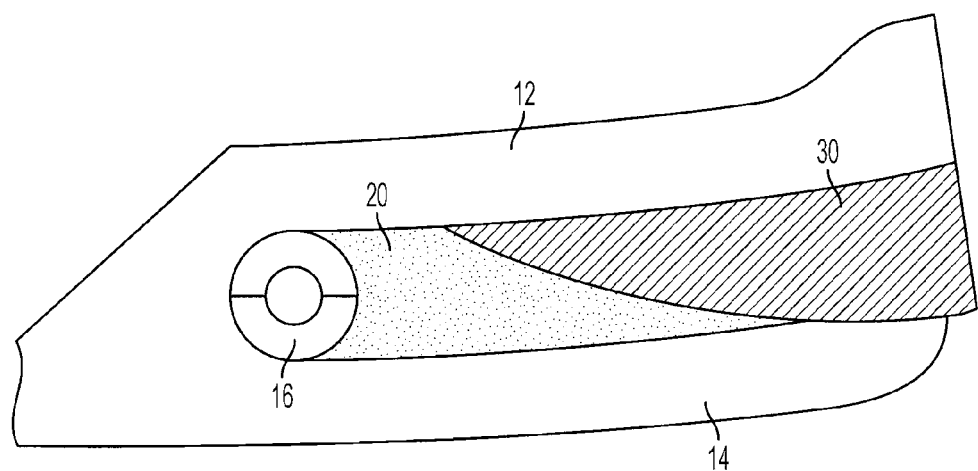
FIG. 8 shows an embodiment of a catapult device of the present invention.

In various embodiments, between the plates 12 and 14 there can be lightweight foam 20, as shown in FIGS. 1-3. This component's purpose is basically as filler, and may extend partially (FIG. 8) or completely (FIG. 2) between the plates 12 and 14. In various embodiments, the catapult device 10 may perform optimally in a case where the space between the plates 12 and 14 is void or empty. However, given the normal spectrum of use for footwear, it might not be desirable to leave the space empty in many instances. Dirt, mud, water, snow, ice, etc. (debris) may find its way within the space and could significantly decrease or even destroy the function of the device. Therefore, various embodiments include a means of blocking debris from entering the working space between the plates 12 and 14. Because the catapult device 10 of various embodiments would perform optimally without any material between the plates 12 and 14, it may be desirable for performance reasons to include a material that is lightweight, reflects good tear strength values, and that possesses specific compression properties. In addition to the criteria above, the ideal candidate foam 20 in various embodiments would compress under very low loading and compress to 30% of original thickness gauge—or more. Based upon these criteria, the foam 20 would preferably be of an open cell type. Thus, polyurethane, rubber, rubber latex, PVC or polyethylene can be used in various embodiments.

Figure 7:
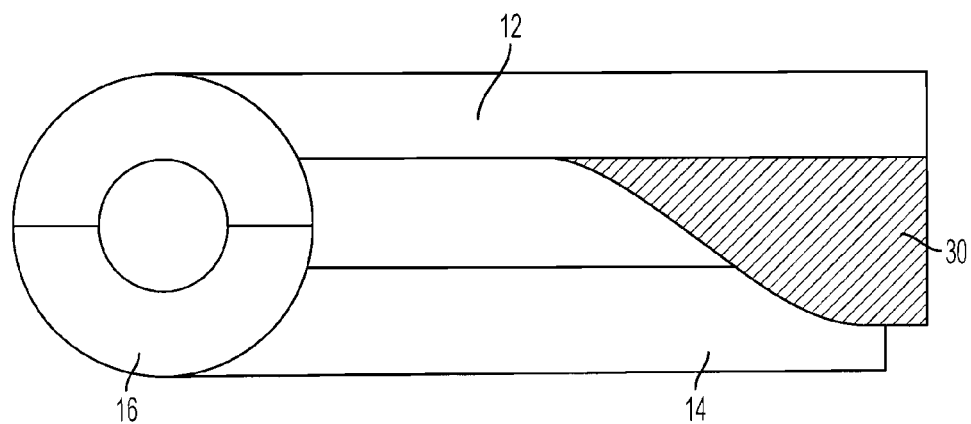
FIG. 7 shows an alternative embodiment of the catapult device including a shroud.

One purpose of the foam 20 is to avoid debris collecting between the plates 12 and 14. The foam 20 may slightly inhibit the performance of the catapult device 10 in various embodiments, since it adds resistance in the loading phase of performance. As such, in an alternative embodiment of the invention shown in FIG. 7, the foam 20 may be replaced with a front shroud 30 on one of the plates 12, 14 (in FIG. 7, it is shown attached to the top plate 12). In various embodiments, the shroud 30 acts to keep debris from entering between the plates 12 and 14, and wraps around a perimeter of the toe area.

Figure 12:
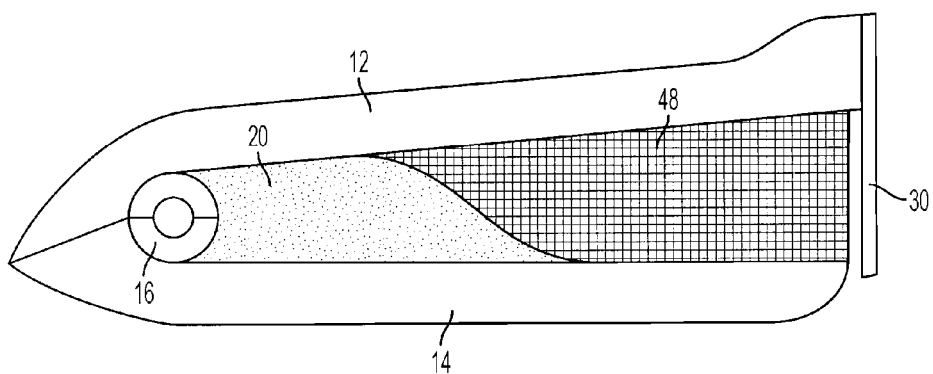
FIG. 12 shows an embodiment of a catapult device of the present invention, with an energy return material augmenting a torsion spring.

In addition, in various embodiments the foam 20 may be reduced in size or removed completely to allow the use of other springs 32, 34, 36 as shown in FIGS. 9A, 9B, 10, and 11. The springs 32, 34, 36 assist the torsion spring 16 in providing propulsion to the wearer of the shoe. In various embodiments, such additional springs could be wave springs as shown in U.S. Pat. No. 4,901,987, or the like. Wave springs are particularly advantageous because the energy return is almost entirely axial, which would serve to press the plates 12 and 14 apart after compression. The springs 32, 34, 36 could be attached directly to the top and bottom plates 12 and 14 in various embodiments. In various embodiments, an energy return or rebound material 48 may be disposed between the plates 12 and 14, as shown in FIG. 12. In some embodiments, the energy return material 48 comprises rubber, Hytrel®, or the like, and creates an additional energy return effect.

Figure 9A:
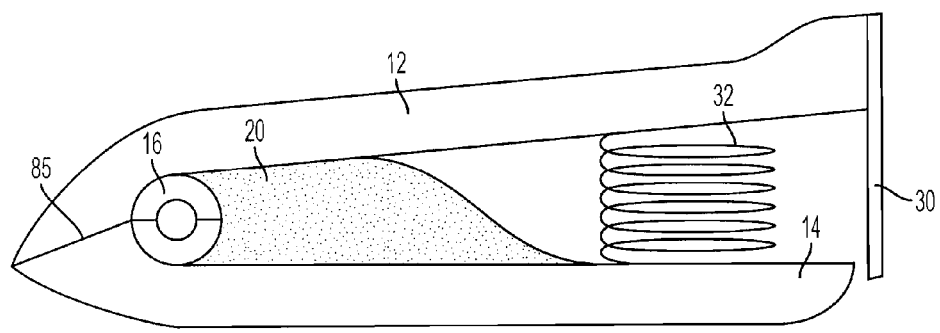
FIG. 9A shows an embodiment of a catapult device of the present invention, with a wave spring augmenting a torsion spring.
Figure 9B:
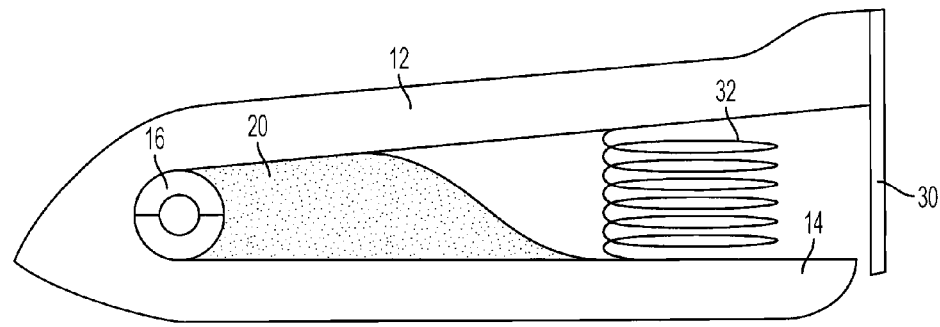
FIG. 9B shows another embodiment of a catapult device of the present invention, with a wave spring augmenting a torsion spring.
Figure 10:
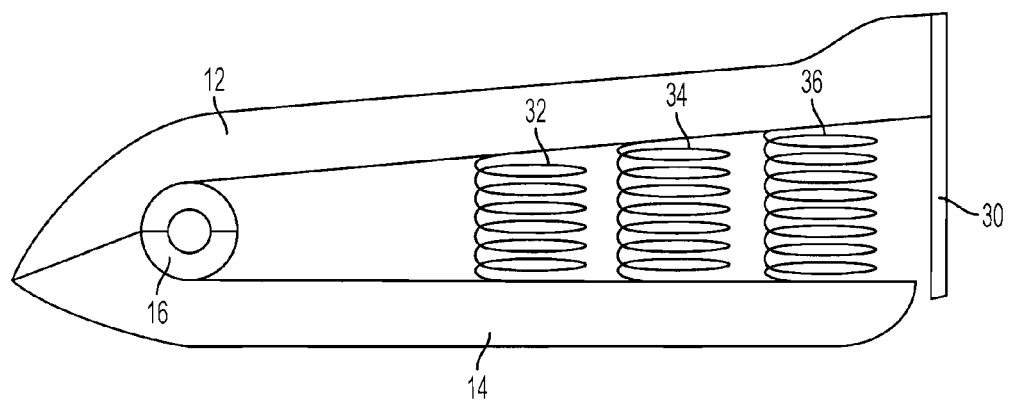
FIG. 10 shows an embodiment of a catapult device of the present invention, with wave springs augmenting a torsion spring.
Figure 11:
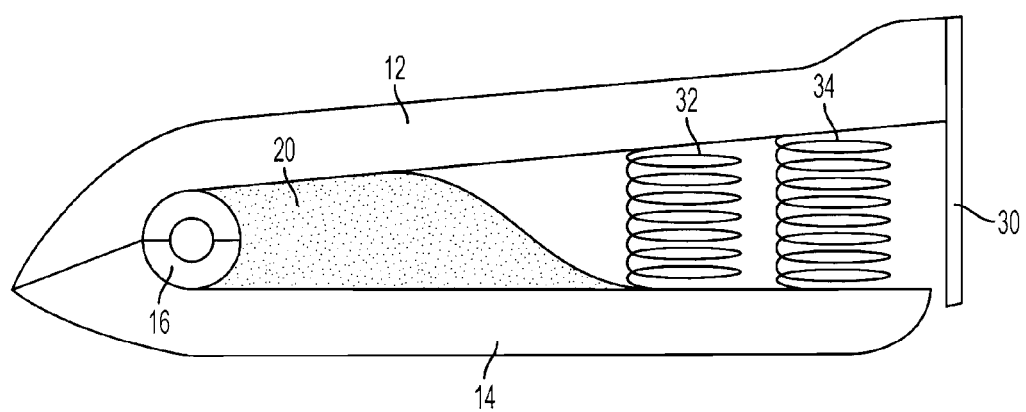
FIG. 11 shows an embodiment of a catapult device of the present invention, with wave springs augmenting a torsion spring.

With reference to FIG. 9A, in various embodiments the top plate 12 and the bottom plate 14 are manufactured as separate units and may have portions in contact with each other at a contact location 85. With reference to FIG. 9B, in various other embodiments, the top plate 12 and the bottom plate 14 are manufactured as a single continuous unit.

As mentioned, in various embodiments the catapult device 10 is mounted to the outsole 22 under a forefoot region by conventional means (gluing, stitching, etc.) and replaces the midsole 38 in the forefoot portion of the shoe 5, as shown in FIG. 2. Thus, in such embodiments, the midsole 38 would extend only from the heel portion of the outsole 22 up to the catapult device 10. With reference to FIG. 2, the shoe 5 may be described with respect to different portions of the shoe 5 along a length of the shoe 5, including a heel portion 52, an arch portion 54, a ball portion 56, and a forefoot portion 58.

Figure 6:
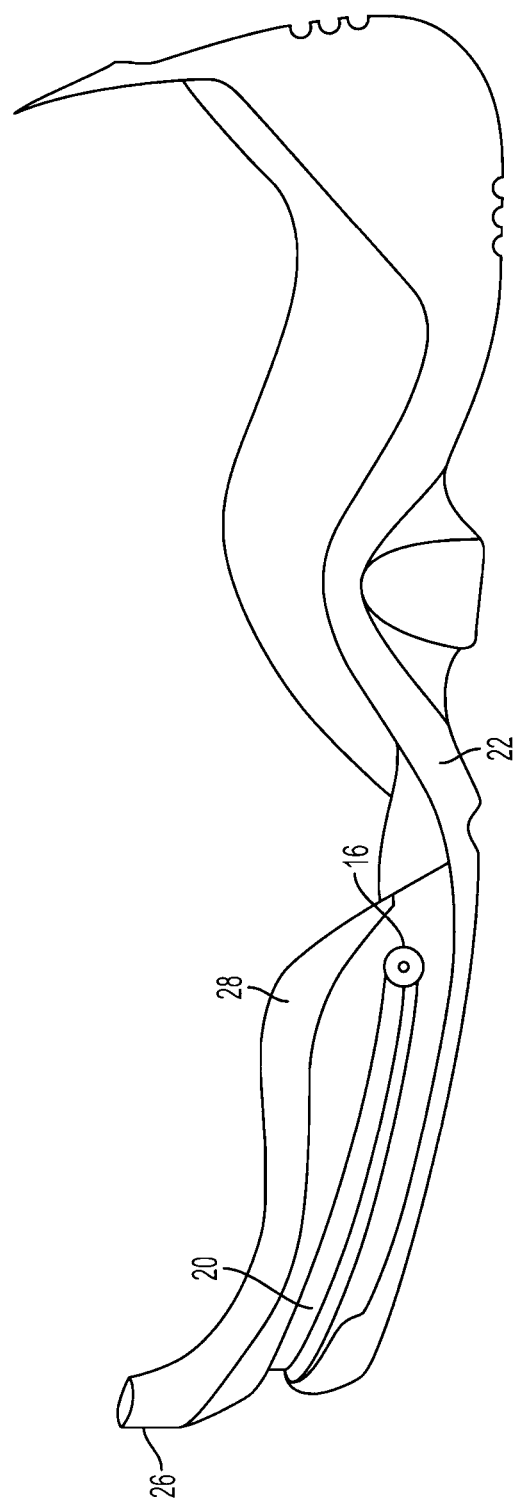
FIG. 6 shows an alternative embodiment of a catapult device of the present invention, with a top part of the catapult device functioning as a toe bumper.

With reference to FIG. 1, in various embodiments, an optimal function of the catapult device 10 within the shoe 5 requires an absence of any material (foam/rubber/etc.) between the catapult device and the shoe upper 24. In other words, it is desirable in various embodiments to have the shoe upper 24 sit directly on the catapult device 10 in the forepart for best performance, as shown in FIG. 1. Therefore, in various embodiments the top plate 12 of the catapult device 10 would be configured to wrap up around the shoe upper 24 and in addition to its primary function of propulsion, forms features such as a toe bumper 26 and a sidewall 28, as shown in FIG. 6. Such a unique construction with the top plate 12 configured to wrap up around the shoe upper 24 would create a very rigid toe bumper 26 and sidewall 28, which would be a departure from typical basketball footwear.

With this approach, an alternative embodiment for the top plate 12 would have the top plate 12 manufactured from more typical, softer/flexible materials (rubber/foam/etc.) and a secondary component then added to it (e.g. steel) added to provide rigidity directly above the bottom plate 14. The bottom plate 14 in such embodiments may still be manufactured from the rigid materials.

FIG. 13 shows a side view of part of a shoe 6 in accordance with another embodiment of the present invention. The shoe 6 includes an outsole 22 and a midsole 38. In the shoe 6, the midsole 38 extends into a forefoot portion of the shoe 6. FIG. 14 illustrates a top view of the midsole 38 from FIG. 13 in accordance with an embodiment of the present invention, where the midsole 38 includes a cavity 39 in which an embodiment of the catapult device 10 is located. Thus, various embodiments allow for placing the catapult device 10 within a midsole 38, such as within the cavity 39 of the midsole 38 or otherwise surrounded by the midsole 38.

Figure 15:
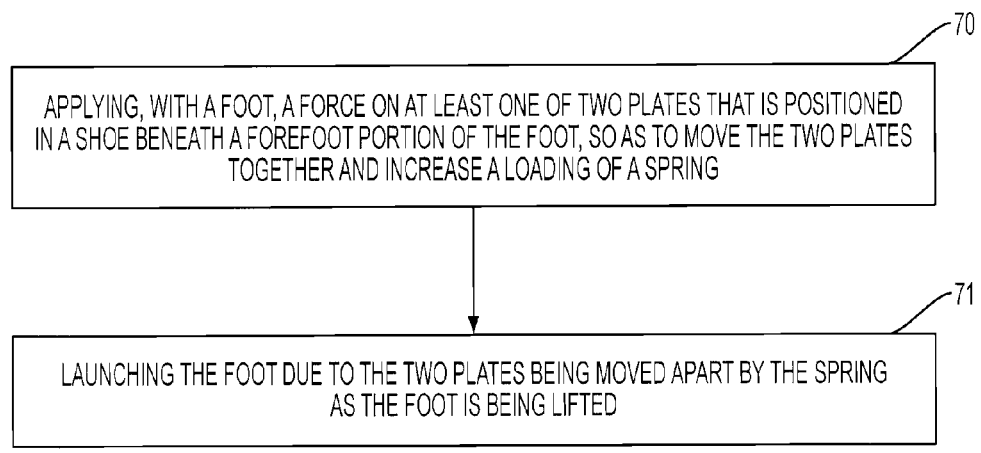
FIG. 15 shows a flowchart of a method in accordance with an embodiment of the present invention.

FIG. 15 illustrates a method in accordance with an embodiment of the present invention. In various embodiments, the method of FIG. 15 allows for storing and returning energy during a propulsion phase of a gait cycle in a human step using a catapult device in a shoe including two plates and a spring that biases the two plates apart from each other. In various embodiments, the method comprises (step 70) applying, with a foot, a force on at least one of the two plates that is positioned in the shoe beneath a forefoot portion of the foot, so as to move the two plates together and increase a loading of the spring, and (step 71) launching the foot due to the two plates being moved apart by the spring as the foot is being lifted.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A device that is installable in a forefoot portion of a shoe, the device comprising:
   a first plate;
   a second plate;
   a filler material positioned between the first plate and the second plate; and
   a spring positioned between the first plate and the second plate; and
   a pin;
   wherein the first plate and the second plate are hinged together by the pin; and
   wherein the filler material is completely outside of the spring and at least a portion of the filler material is located between the pin and the spring.

2. The device of claim 1, wherein the filler material comprises a polymer.

3. The device of claim 1, wherein the filler material comprises ethylene.

4. The device of claim 1, wherein the filler material comprises a vinyl product.

5. The device of claim 1, wherein the filler material comprises foam.

6. The device of claim 1, wherein the filler material comprises at least one material selected from a group consisting of polyurethane, rubber, rubber latex, polyvinyl chloride, and polyethylene.

7. The device of claim 1, further comprising:
a second spring;
wherein the spring is located closer to the pin than the second spring is to the pin.

8. The device of claim 1, further comprising a second spring disposed between the first plate and the second plate.

9. The device of claim 8,
wherein the first plate and the second plate are hinged together at a hinge; and
wherein the spring is located between the second spring and the hinge.

10. The device of claim 9, further comprising:
a third spring disposed between the first plate and the second plate;
wherein the second spring is located between the spring and the third spring.

11. The device of claim 9,
wherein the spring and the second spring are located closer to an end of the first plate that is opposite the hinge than they are to the hinge.

12. The device of claim 1, wherein the spring is a compression spring.

13. The device of claim 12, wherein the spring is positioned to bias the first plate and the second plate apart from each other.

14. The device of claim 12, wherein the compression spring has a coil that is configured to compress in a direction that is orthogonal to the first plate when force is exerted on the second plate.

15. The device of claim 1, wherein the first plate, the second plate, and the pin form a hinge; and wherein the filler material extends from the pin to an outer side of the spring.

16. The device of claim 1, wherein the spring is a coil spring and the filler material is located entirely outside of a center of the spring.

17. The device of claim 1, wherein the spring is a coil spring and the filler material is located entirely outside of an edge of the spring.

18. The device of claim 1, wherein the filler material has a thickness that tapers off as it approaches the spring.

19. The device of claim 1, wherein the filler material comprises a first end that contacts both the first and the second plates; and
wherein the filler material comprises a second end that has a reduced thickness compared to the first end such that the filler material at the second end contacts only one of the first or second plates.

20. The device of claim 19, wherein the first end of the filler material is closer to the pin than the second end of the filler material.

21. The device of claim 1, wherein the filler material that is located between the first and the second plates is located entirely in the forefoot portion of the shoe.

22. A shoe, comprising:
a device located in a forefoot portion of the shoe, the device comprising:
a first plate;
a second plate connected to the first plate by a hinge;
a filler material positioned between the first plate and the second plate; and
a spring positioned between the first plate and the second plate; and
wherein the filler material is completely outside of the spring and at least a portion of the filler material is located between the hinge and the spring.

23. The shoe of claim 22,
wherein the device further comprises a pin; and
wherein the first plate and the second plate are hinged together by the pin.

* * * * *